(12) United States Patent
Correa Bahnsen et al.

(10) Patent No.: US 10,958,676 B2
(45) Date of Patent: Mar. 23, 2021

(54) CLASSIFICATION OF TRANSPORT LAYER SECURITY CERTIFICATES USING ARTIFICIAL NEURAL NETWORKS

(71) Applicant: Easy Solutions Enterprises Corp., Doral, FL (US)

(72) Inventors: Alejandro Correa Bahnsen, Bogota (CO); Ivan Dario Torroledo Pena, Bogota (CO); Luis David Camacho Gonzalez, Bogota (CO)

(73) Assignee: Easy Solutions Enterprises Corp., Doral, FL (US)

( * ) Notice: Subject to any disclaimer, the term of this patent is extended or adjusted under 35 U.S.C. 154(b) by 257 days.

(21) Appl. No.: 16/196,870

(22) Filed: Nov. 20, 2018

(65) Prior Publication Data
US 2020/0162491 A1    May 21, 2020

(51) Int. Cl.
*H04L 29/06*     (2006.01)
*G06N 3/02*      (2006.01)

(52) U.S. Cl.
CPC .......... *H04L 63/1425* (2013.01); *G06N 3/02* (2013.01); *H04L 63/0823* (2013.01); *H04L 63/145* (2013.01); *H04L 63/1416* (2013.01); *H04L 63/1483* (2013.01); *H04L 63/166* (2013.01)

(58) Field of Classification Search
CPC ............. H04L 63/1425; H04L 63/0823; H04L 63/1416; H04L 63/145; H04L 63/1483; H04L 63/166; G06N 3/02
See application file for complete search history.

(56) References Cited

U.S. PATENT DOCUMENTS

| | | | |
|---|---|---|---|
| 8,677,466 | B1 | 3/2014 | Chuang et al. |
| 8,966,659 | B2 | 2/2015 | Janjua et al. |
| 9,407,644 | B1 | 8/2016 | Cheng et al. |
| 2014/0095866 | A1 | 4/2014 | Grebennikov et al. |
| 2014/0283054 | A1 | 9/2014 | Janjua et al. |
| 2015/0193695 | A1* | 7/2015 | Cruz Mota .......... G06N 3/0454 706/12 |
| 2018/0097835 | A1* | 4/2018 | McGrew ............. H04L 61/1511 |
| 2018/0139214 | A1* | 5/2018 | Anderson ........... H04L 63/1408 |
| 2020/0120107 | A1* | 4/2020 | McGrew ............. H04L 63/1408 |

OTHER PUBLICATIONS

Ivan Torroledo et al., "Hunting Malicious TLS certificates with Deep Neural Networks", . AISec '18: Proceedings of the 11th ACM Workshop on Artificial Intelligence and Security [online], Oct. 19, 2018, pp. 64-73, and table 2.

International Search Report and Written Opinion, PCT/US2019/061754, dated Mar. 18, 2020.

* cited by examiner

*Primary Examiner* — Shin-Hon (Eric) Chen
(74) *Attorney, Agent, or Firm* — Greenberg Traurig

(57) ABSTRACT

Technologies for classification of web security certificates using artificial neural networks. Some of the example technologies disclosed herein are directed specifically at classification of TLS certificates using artificial neural networks. The technologies include methods for identifying malicious use and generation of web security certificates, by using deep neural networks. In one example embodiment, content of TLS certificates can be used as input for deep neural networks to successfully identify certificates of malicious actors as well as malicious patterns used by attackers.

18 Claims, 8 Drawing Sheets

SSL and TLS Certificate Details

| Variable Name | Description |
|---|---|
| Fingerprint | Certificate SHA-1 hashed finger print |
| Serial Number | Certificate unique number for the issue. |
| Subject Principal | Subject's main field with details |
| Issuer Principal | Issuer's main field with details |
| Not Before | Date of creation |
| Not After | Expiration date |
| Extensions | Number of extensions contained in certificate |
| Version | Certificates SSL version number |
| Algorithm | Encryption algorithm used |

FIG. 5

Certificate Viewer: Abcdefg.com    X

| General | Details |

This certificate has been verified for the following usages:

SSL Server Certificate

Issued To

| | |
|---|---|
| Common Name (CN) | abcdefg.com |
| Organization (O) | Abcdefg Inc. |
| Organizational Unit (OU) | <Not Part Of Certificate> |

Issued By

| | |
|---|---|
| Common Name (CN) | hijklmn.com |
| Organization (O) | Hijklmn Inc. |
| Organizational Unit (OU) | <Not Part Of Certificate> |

Validity Period

| | |
|---|---|
| Issued On | Thursday, August 30, 2018 at 7:03:07 AM |
| Expires On | Saturday, August 31, 2019 at 7:03:07 AM |

Fingerprints

| | |
|---|---|
| SHA-256 Fingerprint | CB 96 F8 3C 12 A4 IE A3 17 A7 A8 9F FE EA 3B 07 9A C8 7C AF 3F 9G FB A3 DA E9 07 2A 38 88 82 ED |
| SHA-1 Fingerprint | A8 E4 7D A9 3G 8G 67 A8 4A 49 57 6A 78 89 83 55 66 A2 B4 5C 99 |

FIG. 6

| Feature Name | Description |
|---|---|
| SubjectCommonNameIp | Indicates if CN is an IP address instead of domain |
| Selfsigned | Indicates if certificate is self signed |
| Is_extended_validated | Indicates if certificate is extended validated |
| Is_organization_validated | Indicates if certificate is organization validated |
| Is_domain_validated | Indicates certificate is domain validated |
| SubjecthasOrganization | Indicates if subject principal has O field |
| IssuerhasOrganization | Indicates if issuer principal has O field |
| SubjecthasCompany | Indicates if subject principal has CO field |
| IssuerhasCompany | Indicates if issuer principal has CO field |
| SubjecthasState | Indicates if subject principal has ST field |
| IssuerhasState | Indicates if issuer principal has ST field |
| SubjecthasLocation | Indicates if subject principal has L field |
| IssuerhasLocation | Indicates if issuer principal has L field |
| Subject_onlyCN | Indicates if subject principal has only CN field |
| Subject_is_com | Indicates if subject CN is a ".com" domain |
| Issuer_is_com | Indicates if issuer CN is a ".com" domain |
| Is_free | Indicates if the certificate is free generated |
| HasSubjectCommonName | Indicates if CN is present in subject principal |
| HasIssuerCommonName | Indicates if CN is present in issuer principal |
| SubjectElements | Number of details present in subject principal |
| IssuerElements | Number of details present in issuer principal |
| SubjectLength | Number of characters of whole subject principal string |
| IssuerLength | Number of characters of whole issuer principal string |
| Subject_eq_Issuer | Boolean indicating if Subject Principal = Issuer Principal |
| ExtensionNumber | Number of extensions contained in the certificate |
| DaysValidity | Calculated days between not before not after days |
| Ranking_C | Calculated ranking of domain based on domain ranking |
| SubjectCommonName | Calculated character entropy in the subject CN |
| Euclidian_Subject_Subjects | Calculated euclidean distance of subject among all subjects |
| Euclidian_Subject_English | Calculated euclidean distance of subject characters among English Characters |
| Euclidian_Issuer_Issuers | Calculated euclidean distance of issuer among all Issuers |
| Euclidian_Issuer_English | Calculated euclidean distance of issuer characters among English Characters |
| Ks_stats_Subject_Subjects | Kolmogorov-Smirnov statistics for subject in subjects |
| Ks_stats_Subject_English | Kolmogorov-Smirnov statistic for subject in English characters |
| Ks_stats_Issuer_Issuers | Kolmogorov-Smirnov statistics for issuers in issuers |
| Ks_stats_Issuer_English | Kolmogorov-Smirnov statistic for issuer in English characters |
| Kl_dist_Subject_Subjects | Kullback-Leiber Divergence for subject in Subjects |
| Kl_dist_Subject_English | Kullback-Leiber Divergence for subject in English characters |
| Kl_dist_Issuer_Issuers | Kullback-Leiber Divergence for issuer in Issuers |
| Kl_dist_Issuer_English | Kullback-Leiber Divergence for issuer in English characters |

FIG. 7

CLASSIFICATION OF TRANSPORT LAYER SECURITY CERTIFICATES USING ARTIFICIAL NEURAL NETWORKS

TECHNICAL FIELD

Embodiments of the disclosure relate generally to classification of web security certificates using artificial neural networks, and more specifically, relate to, for example, using artificial neural networks to classify transport layer security (TLS) certificates.

BACKGROUND

Encryption is widely used across the Internet to secure communications and ensure that information cannot be intercepted and read by a third party. However, encryption also allows cybercriminals or threat actors to hide their messages and carry out successful malware attacks while avoiding detection. Further aiding threat actors, is the fact that web browsers can often display a green lock symbol in the Uniform Resource Locator (URL) bar when a connection to a website is encrypted. This symbol can give a false sense of security to users, who are in turn more likely to fall victim to phishing attacks or malware. The risk of encrypted traffic means that information security researchers must explore new techniques to detect, classify, and take countermeasures against malicious traffic.

SUMMARY

Disclosed herein are technologies for classification of web security certificates using artificial neural networks. Some of the example technologies disclosed herein are directed specifically at classification of TLS certificates using artificial neural networks. However, it should be understood many of the features and processes described herein can be used for classification of other types of web security certificates using artificial neural networks, such as for classification of secure sockets layer (SSL) certificates.

The technologies include methods for identifying malicious use and generation of web security certificates, by using deep neural networks. In one example embodiment, content of TLS certificates can be used as input for deep neural networks to successfully identify certificates of malicious actors as well as malicious patterns used by attackers (i.e., threat actors). The technologies can include use of neural networks for determining the likelihood of a security certificate created by a threat actor.

The methods can include receiving, in an artificial neural network (ANN), a plurality of groups of encoded parameters generated from a transport layer security (TLS) certificate. The methods can also include outputting, by the ANN, a score of the TLS certificate based on the plurality of groups of encoded parameters. The ANN can include a recurrent neural network (RNN) configured to process a first group of the plurality of groups of encoded parameters. The RNN can be or include a long short-term memory (LSTM) network.

In some examples of the methods, the TLS certificate is a classified TLS certificate that has an issuer of the certificate and a subject of the certificate. The subject in such examples can have a classification of being associated with a malicious activity. In such examples, where it is known that the subject has a classification of being associated with a malicious activity, and examples of the methods can include training the ANN to match the score with the classification of the subject classified TLS certificate.

In some examples of the methods, the score can be representative of the probability that the TLS certificate has a subject associated with a malicious activity selected from a group consist of phishing and malware attack. Also, in some embodiments, the methods can include comparing the score to a threshold value, and determining that the TLS certificate is more likely than not associated with a malicious activity, based on the comparison of the score to the threshold value. And, in some examples, the methods can include processing the score to output a probability value related to the probability that the TLS certificate is associated with a malicious activity.

In some examples of the methods, the plurality of groups of encoded parameters can include a first group of encoded parameters and a second group of encoded parameters. In such examples, the ANN can include a first portion and a second portion separate from the first portion in processing inputs. Examples of the method can include processing, by the first portion of the ANN, the first group of encoded parameters to generate first outputs for the TLS certificate. Also, the examples can include processing, by the second portion of the ANN independent of the processing of the first portion, the second group of encoded parameters to generate second outputs for the TLS certificate. The methods also can include combining, in the ANN, the first outputs and the second outputs to generate the score.

In some example embodiments, such as the aforesaid examples, the first group of encoded parameters can be generated from a subject principal string of the TLS certificate and the second group of encoded parameters can be generated from an issuer principal string of the TLS certificate. The subject principal string can have a plurality of alphanumerical field values of the TLS certificate identifying attributes of the subject of the TLS certificate, and the issuer principal string can have a plurality of alphanumerical field values of the TLS certificate identifying attributes of the issuer of the TLS certificate. The subject principal string can include one or more fields, such as an organization field, a company field, a state field, a location field, and/or a common name (CN) field. The issuer principal string can include one or more fields as well, such as an organization field, a company field, a state field, a location field, and a CN field.

In some embodiments, such as the some of the aforesaid examples, the first portion of the ANN can include a first long short-term memory (LSTM) network layer to process the first group of encoded parameters, and the second portion of the ANN can include a second LSTM network layer to process the second group of encoded parameters. The ANN in such examples can also include a third portion separate from the first portion and the second portion. The third portion can include a dense layer having at least one rectifier. For example, the dense layer can include and use a rectifier linear unit activation function in one or more neurons of the dense layer. In some examples, the dense layer can include and use a rectifier linear unit activation function in every neuron of the dense layer.

In some embodiments, such as the some of the aforesaid examples, the methods can further include receiving, in the dense layer, an encoded set of features of the TLS certificate, separate from the first group of encoded parameters and the second group of encoded parameters. In such examples, the methods can include outputting, by the dense layer, a dense layer output vector according to the encoded set of features. Also, the methods can include concatenating, in the ANN, the dense layer output vector, the first outputs of the first portion, the second outputs of the second portion to generate a concatenated vector. Further, the methods can include receiving, by a second dense layer of the ANN, the concatenated vector. The methods can also include outputting, by the second dense layer, a second dense layer output vector according to the concatenated vector, wherein the second dense layer comprises a rectifier. The methods can further include receiving, by a dropout layer of the ANN, the second dense layer output vector. Such methods also can include generating, by the dropout layer, a reduced vector. The methods can also include receiving, by a third dense layer of the ANN, the reduced vector. The third dense layer can include a sigmoid function. For example, the third dense layer can have a neuron with a sigmoid function used as an activation function. In some embodiments, the third dense layer has only one neuron with a sigmoid function used as an activation function. And, methods can include outputting, by the third dense layer, the score according to the reduced vector.

Some of the technologies described herein include a non-transitory computer-readable storage medium. The medium can implement the features and operations of the aforesaid methods. For example, the medium can have instructions that, when executed by a processing device, cause the processing device to input an encoded parameter of a TLS certificate into an ANN, as well as output a score according to an algorithm representative of the ANN and the encoded parameter. In examples where it is known that the subject has a classification of being associated with a malicious activity, the instructions, when executed by a processing device, can cause the processing device to train the ANN to match the score with the classification of the subject classified TLS certificate. Also, examples of the instructions, when executed by a processing device, can cause the processing device to compare the score to a threshold value, and determine that the TLS certificate is more likely than not associated with a malicious activity, based on the comparison of the score to the threshold value. And, examples of the instructions, when executed by a processing device, can cause the processing device to process the score to output a probability value related to the probability that the TLS certificate is associated with a malicious activity. In some examples, the instructions of the medium, when executed by a processing device, can cause the processing device to process, by the first portion of the ANN, the first group of encoded parameters to generate first outputs for the TLS certificate. Also, examples of the instructions, when executed by a processing device, can cause the processing device to process, by the second portion of the ANN independent of the processing of the first portion, the second group of encoded parameters to generate second outputs for the TLS certificate. Examples of the instructions, when executed by a processing device, can also cause the processing device to combine, in the ANN, the first outputs and the second outputs to generate the score.

Also, for example, the instructions, when executed by a processing device, can cause the processing device to receive, in the dense layer, an encoded set of features of the TLS certificate, separate from the first group of encoded parameters and the second group of encoded parameters. The instructions, when executed by a processing device, can also cause the processing device to output, by the dense layer, a dense layer output vector according to the encoded set of features. And, instructions, when executed by a processing device, can also cause the processing device to concatenate, in the ANN, the dense layer output vector, the first outputs of the first portion, the second outputs of the second portion to generate a concatenated vector. Further, the medium, via the instructions, can similarly implement the receiving, by a second dense layer of the ANN, the concatenated vector, as well as the outputting, by the second dense layer, a second dense layer output vector according to the concatenated vector, wherein the second dense layer comprises a rectifier. The medium can also implement: the receiving, by a dropout layer of the ANN, the second dense layer output vector; the generating, by the dropout layer, a reduced vector; the receiving, by a third dense layer of the ANN, the reduced vector; and the outputting, by the third dense layer, the score according to the reduced vector.

Some of the technologies described herein include a computer system. The computer system can implement the features and operations of the aforesaid methods and the aforesaid medium. The medium can specifically be implemented by memory of the system. The computer system can also include the processing device.

BRIEF DESCRIPTION OF THE DRAWINGS

The present disclosure will be understood more fully from the detailed description given below and from the accompanying drawings of various embodiments of the disclosure.

FIG. 5 is a depiction of a list of some example details found in SSL and TLS certificates, in accordance with some embodiments of the present disclosure.

FIG. 6 is a depiction of a view of an example security certificate showing at least some parameters of the certificate, in accordance with some embodiments of the present disclosure.

FIG. 7 is a depiction of a list of example types of features extracted from the TLS certificate, in accordance with some embodiments of the present disclosure.

DETAILED DESCRIPTION

Figure 1:
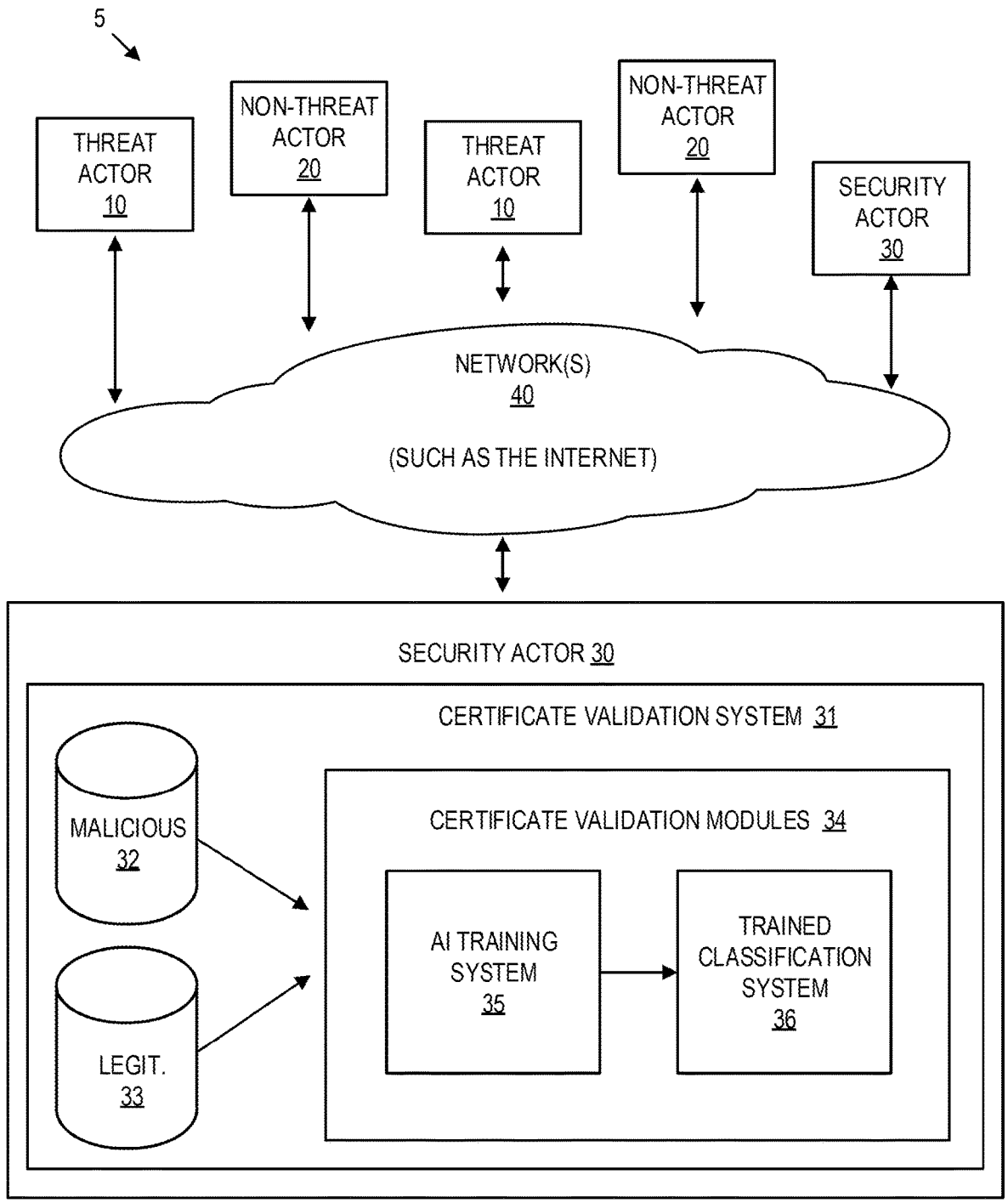
FIG. 1 illustrates an example network of computer systems to implement technologies for determining intent of subjects of security certificates using neural networks, in accordance with some embodiments of the present disclosure.

Aspects of the present disclosure are directed to classification of web security certificates using artificial neural networks, and more specifically, to, for example, using artificial neural networks to classify TLS certificates. The classification of the certificates can assist in determining whether or not a subject of a certificated has a malicious intent. For instance, aspects of the present disclosure are directed to using neural networks for determining when a security certificate is a malicious security certificate or at least probable of being a malicious security certificate.

One example problem the aspects of the disclosure overcome or at least reduce is the aforementioned security risk involved with using encryption over a network to secure communications. Encryption allows cybercriminals or threat actors to hide their messages and carry out successful malware attacks while avoiding detection. Another problem is that web browsers often display a green lock symbol or some other similar type of icon in the URL bar or a webpage when a connection to a website is encrypted or secured in another matter. Such graphics can give a false sense of security to users, who are in turn more likely to fall victim to phishing attacks or malware.

To overcome or at least reduce the aforesaid risks and many other risks with securing network communications, the technologies of the present disclosure leverage neural networks for determining intent of subjects of security certificates. The technologies include methods for identifying malicious use of web security certificates, by using deep neural networks. In one example embodiment, content of TLS certificates can be used as input for deep neural networks to successfully identify malicious certificates as well as malicious patterns used by attackers (i.e., threat actors).

Another example problem overcome or at least reduced by the disclosed technologies is that current browser strategies to validate web certificates may only rely on checking if a certificate is self signed and if the expiration dates are suspicious. However, domain validation certificates, which are the simplest validation type, still send a safeness message to the end user. Attackers can use self-signed certificates as effective stealth certificates because they are quick and inexpensive to generate. However, by using this sort of certificate, threat actors expose their intentions, leaving them vulnerable to detection, tracking and blacklisting via the disclosed technologies. Detection of such certificate abuse, in real time, is possible using the disclosed technologies given that there are identifiable patterns in attacker's misuse of security certificates such as the pattern of using self-signed certificates.

In some embodiments disclosed herein, artificial intelligence, deep neural networks and deep learning can be used for modeling and the detection. For example, deep recurrent neural networks, such as LSTM networks, can be used for the modeling. Recurrent neural networks include neural networks that enhance and analyze data with sequential dependence as time series variables or text data. An example drawback of recurrent neural networks is that they are able to only learn the patterns of short dependencies, and not patterns in long-term dependencies. In some embodiments, to enhance the detection of possible malicious certificates and to mitigate the aforesaid problem with conventional recurrent neural networks, LSTM networks can be used. LSTM models enable effective learning processes of both short- and long-term dependencies by modifying the fundamental processing unit or neuron.

In some embodiments disclosed herein, a security certificate can include an unencrypted file attached to a public encryption key. The certificate can contain organization details about the owner of the certificate and encryption keys. The certificate can be used to encrypt web traffic such as SSL and TLS traffic. The encryption system used by TLS is based on the RSA standard for symmetric encryption where two random keys are generated for one public and one private. The encrypted communication process starts after generating public and private keys by the party who has generated keys. They encrypt the message using the private key and keep it. The message is then sent to the receiver along with public key. The message can be decrypted with the public key. To send a message back, the new message is encrypted using public key and can be decrypted with the private key. Those encrypted messages also contain a digital certificate that has identification details. This process keeps communication private between both parties. Some example details of SSL and TLS certificates are shown in a table depicted in FIG. 5.

FIG. 1 illustrates an example network of computer systems 5 that can implement technologies for determining intent (e.g., malicious intent) of subjects of security certificates using neural networks, in accordance with some embodiments of the present disclosure. Such technologies can include processes for determining an intent of a subject of a TLS certificate. The network of computer systems 5 includes threat actor computer systems 10, non-threat actor computer systems 20, and security actor computer systems 30. The threat actor computer systems 10, the non-threat actor computer systems 20, and the security actor computer systems 30 communicate with each other through one or more communications networks 40.

The communications network(s) 40 can include the Internet and/or any other type of interconnected communications network. The communications network(s) 40 can also include a single computer network or a telecommunications network. The communications network(s) 40 can also include a local area network (LAN) such as a private computer network that connects computers in small physical areas, a wide area network (WAN) to connect computers located in different geographical locations, and/or a metropolitan area network (MAN)—also known as a middle area network—to connect computers in a geographic area larger than that covered by a large LAN but smaller than the area covered by a WAN.

The security actor computer systems 30 can include a certificate validation system 31. The certificate validation system 31 includes a known malicious security certificate database 32, a known legitimate security certificate database 33, and certificate validation modules 34. The certificate validation modules 34 can include an AI training system 35 and a trained classification system 36 that is derived from machine learning training of the AI training system 35.

Also, the certificate validation system 31 can receive a security certificate from the threat actors 10 or the non-threat actors 20 and can use the trained classification system 36 to determine an intent (such as malicious intent) of the subject of the security certificate. For example, the trained classification system 36 can determine or at least predict an intent of a TLS certificate received from a computer system via the network(s) 40. The combination of the AI training system 35 and the trained classifier 36 can include an artificial intelligence architecture based on a recurrent neural network such as an LSTM network.

The malicious security certificate database 32 stores data associated with known malicious or illegitimate security certificates and it can store the known malicious or illegitimate security certificates as well. The known legitimate security certificate database 33 stores data associated with known legitimate security certificates and it can store the known legitimate security certificates as well. The data and/or the certificates stored in the databases can be used as input for machine learning processes of the AI training system 35 to derive the trained classification system 36.

Figure 4:
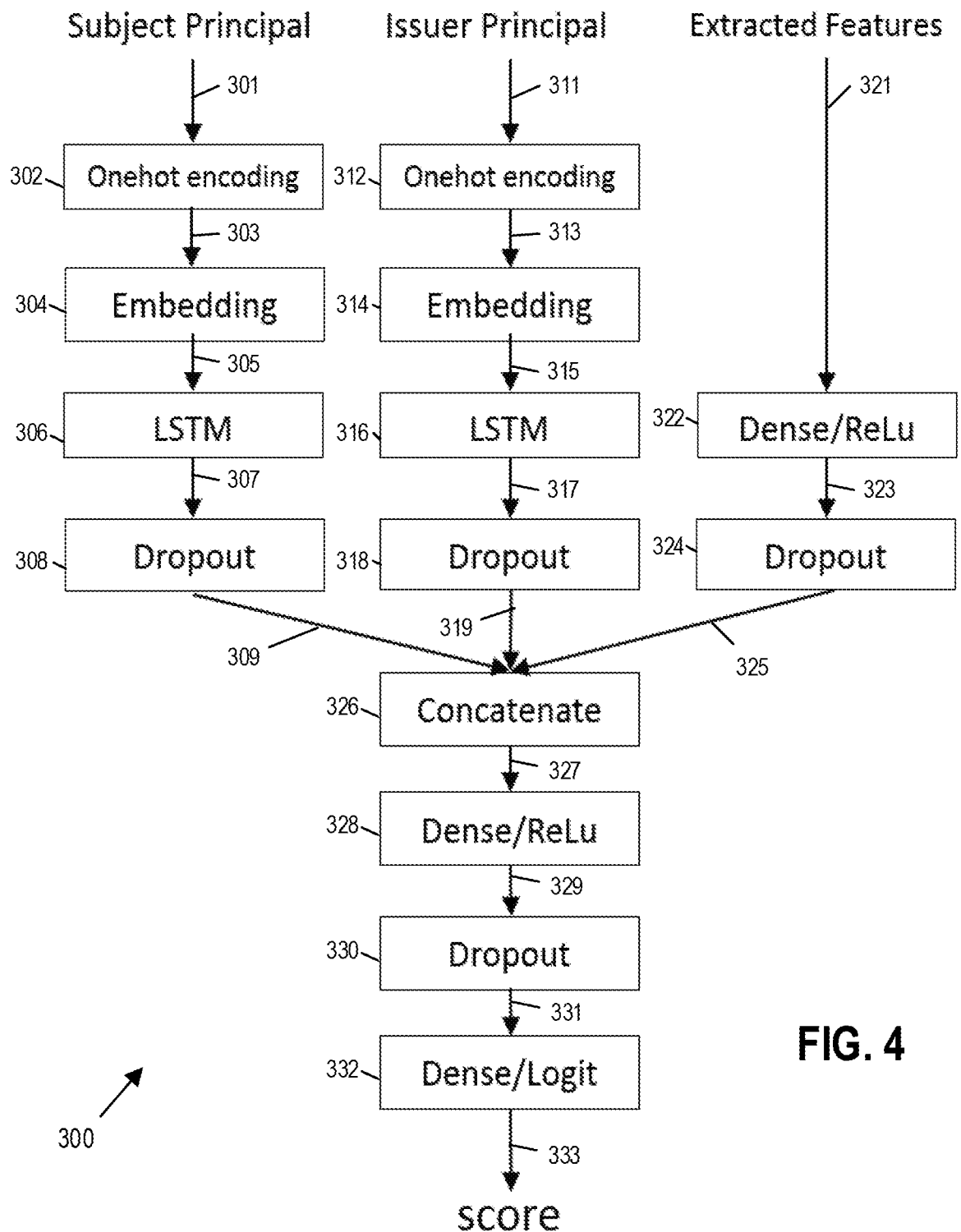
FIG. 4 is a flow diagram of an example method to determine an intent of subjects of security certificates using deep neural networks, in accordance with some embodiments of the present disclosure.

In an example embodiment, using LSTM units, the AI training system 35 can build a model (e.g., the trained classifier 36). An example flowchart associated with the model is shown in FIG. 4. The model can receive a pre-classified security certificate or data related to the pre-classified security certificate as a character sequence and/or one or more arrays as input. The input can be received from one or more databases such as an additional database of the security actor 30 or of another system in the network(s) 40. The model then outputs a value that correlates to the input of the model. The model can be trained using many inputs of many certificates that are already classified. This can be done until a desired score related to the known classification is outputted.

Then, after training, the trained model can be used to predict if an inputted certificate corresponds to a case of a certain classification such as a malicious certificate, e.g., a certificate with a subject that has a malicious intent.

In general, the certificate validation system uses an ANN to determine and/or classify whether a certificate belongs to category A or not (such as belongs to a subject with malicious intent or not). At first, the ANN has no knowledge about category A (that is why its intelligence is "artificial"). The AI training system 35 trains the ANN according to input from databases 32 and 33 and some other known processes for enhancing a neural network model. Other processes, not described herein, can generate the databases of certificates that are judged/classified as category A or not. A certificate can be "measured" or quantified in certain aspects, as a set of "features" that can be calculated and/or quantified by a computer automatically from the information included in and/or associated with the certificated, using a set of rules. These calculations, quantifications and calculations can be part of the AI training system 35 or, more generally, the modules 34. The ANN is trained using the database to make the classifications; and the parameters of the ANN is adjusted through training or machine learning such that the classification results of the ANN best match with the decisions made by human or another process. These decisions are recorded in the databases 32 and 33. If the ANN looks effective in judging the certificates in the databases 32 and 33, the ANN can then be used by the trained classification system 36 to classify a new certificate that is not already in one of the databases 32 and 33.

In an example, each input character is translated by a 128-dimension embedding. Also, the translated certificate or certificate data is fed into a LSTM layer as a 150-step sequence, for example. These processes can be performed by the AI training system 35 and/or the trained classification system. In most embodiments, the AI training system 35 trains the LSTM layer. Then, the classification is performed by the trained classification system 36. The LSTM network can be trained by back-propagation using a cross-entropy loss function and dropout in the last layer, and can enhance detection of malicious security certificates accordingly.

Each of the computer systems of the actors 10, 20, and 30 can include memory that can include media. The media can include or be volatile memory components, non-volatile memory components, or a combination of such. In some embodiments, the memory is a storage system. An example of a storage system is a SSD. In some embodiments, the memory is a hybrid memory/storage sub-system. In general, each of the computer systems can include a host system that uses the memory. For example, the host system can write data to the memory and read data from the memory.

The host system can be a computing device such as a desktop computer, laptop computer, network server, mobile device, or such computing device that includes a memory and a processing device. The host system can include or be coupled to the memory so that the host system can read data from or write data to the memory. The host system can be coupled to the memory via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system and the memory. The host system can further utilize an NVM Express (NVMe) interface to access memory components when the memory is coupled with the host system by the PCIe interface. The physical host interface can provide an interface for passing control, address, data, and other signals between the memory and the host system.

The memory components can include any combination of the different types of non-volatile memory components and/or volatile memory components. An example of non-volatile memory components includes a negative-and (NAND) type flash memory. Each of the memory components can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system. Although non-volatile memory components such as NAND type flash memory are described, the memory components can be based on any other type of memory such as a volatile memory. In some embodiments, the memory components can be, but are not limited to, random access memory (RAM), read-only memory (ROM), dynamic random-access memory (DRAM), synchronous dynamic random-access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components can be grouped as memory pages or data blocks that can refer to a unit of the memory component used to store data.

A memory system controller (hereinafter referred to as "controller") can communicate with the memory components to perform operations such as reading data, writing data, or erasing data at the memory components and other such operations. The controller can include hardware such as one or more integrated circuits and/or discrete components, a buffer memory, or a combination thereof. The controller can be a microcontroller, special purpose logic circuitry (e.g., a field programmable gate array (FPGA), an application specific integrated circuit (ASIC), etc.), or other suitable processor. The controller can include a processor (processing device) configured to execute instructions stored in local memory. In the illustrated example, the local memory of the controller includes an embedded memory configured to store instructions for performing various processes, operations, logic flows, and routines that control operation of the memory, including handling communications between the memory and the host system. In some embodiments, the local memory can include memory registers storing memory pointers, fetched data, etc. The local memory can also include read-only memory (ROM) for storing micro-code. The example memory can include the controller, or in another embodiment of the present disclosure, the memory may not include a controller, and can instead rely upon external control (e.g., provided by an external host, or by a processor or controller separate from the memory).

In general, the controller can receive commands or operations from the host system and can convert the commands or operations into instructions or appropriate commands to achieve the desired access to the memory components. The controller can be responsible for other operations such as wear leveling operations, garbage collection operations, error detection and error-correcting code (ECC) operations, encryption operations, caching operations, and address translations between a logical block address and a physical block address that are associated with the memory components. The controller can further include host interface circuitry to communicate with the host system via the physical host interface. The host interface circuitry can convert the commands received from the host system into command instructions to access the memory components as well as convert responses associated with the memory components into information for the host system.

The memory can also include additional circuitry or components. In some embodiments, the memory can include a cache or buffer (e.g., DRAM) and address circuitry (e.g., a row decoder and a column decoder) that can receive an address from the controller and decode the address to access the memory components.

In some aspects of the present disclosure, the memory includes the certificate validation system 31. In some embodiments, the controller includes at least a portion of the certificate validation system 31. For example, the controller can include a processor (processing device) configured to execute instructions stored in local memory for performing the operations described herein such as the operations described herein associated with the certificate validation system 31. In some embodiments, the certificate validation system 31 is part of the host system, an application, or an operating system.

The certificate validation system 31, can use the memory, the memory components, and the host system to implement technologies for determining an intent of a subject of a security certificate using neural networks.

Further details with regards to the operations of the certificate validation system 31 are described below.

Figure 2:
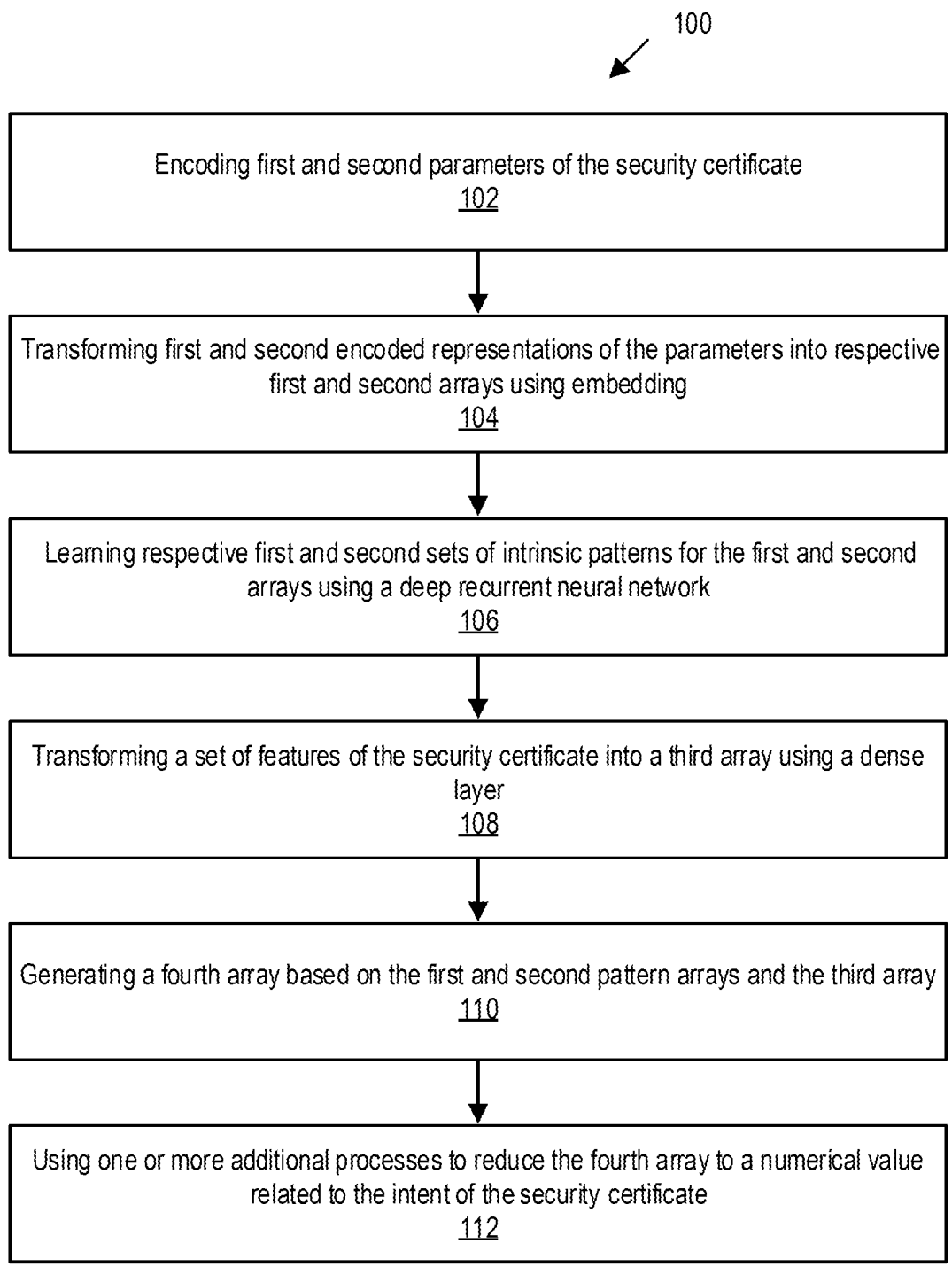
FIG. 2 is a flow diagram of an example method to determine an intent of subjects of security certificates using neural networks, in accordance with some embodiments of the present disclosure.

FIG. 2 is a flow diagram of an example method 100 for determining an intent (such as malicious intent) of a subject of a security certificate (such as a TLS certificate) using neural networks, in accordance with some embodiments of the present disclosure. The method 100 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 100 is performed by one or more aspects of the certificate validation system 31. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 102, a processing device encodes first and second parameters of the security certificate to generate first and second encoded representations. In some embodiments, the first parameter of the security certificate is a subject principal raw string and the second parameter of the security certificate is an issuer principal raw string. For example, the string "abcdefg.com", the string "Abcdefg Inc.", or a combination thereof in the view of the SSL Server Certificate shown in FIG. 6 could be selected as the subject principal raw string. And, for example, the string "hijklmn.com", the string "Hijklmn Inc.", or a combination thereof in the view of the SSL Server Certificate shown in FIG. 6 could be selected as the issuer principal raw string.

In some embodiments, the encoding of the first and the second parameters includes one-hot encoding the first and the second parameters. For example, the encoding of the first and the second parameters according to the one-hot encoding can include generating a model (such as an encoded representation of the strings) define by:

X features with shape N×S×V, and

Y label with shape N×V, wherein N is the number of certificates analyzed, S is the maximum number of characters in each of the encoded first and second parameters and V is the number of different characters in the vocabulary, such that for each row in X representing a certificate is predicted a row in Y representing a probability distribution of the next character.

At block 104, the processing device and/or another processing device transforms each of the first and second encoded representations into respective first and second arrays using embedding.

At block 106, the processing device and/or another processing device learns respective first and second sets of intrinsic patterns for the first and second arrays using a deep recurrent neural network, such as LSTM network, which results in respective first and second pattern arrays for the first and second sets of intrinsic patterns.

At block 108, the processing device and/or another processing device transforms a set of features of the security certificate into a third array using a dense layer. The dense layer can include a plurality of neurons using a rectifier. Also, the dense layer can include a neuron layer using a sigmoid function. The neuron layer using the sigmoid function can output a probability of the security certificate being malicious. The one or more additional processes can also include a second dense layer that includes a neuron layer using a sigmoid function. Alternatively, the neuron layer using the sigmoid function of the second dense layer can output a probability of the security certificate being malicious. In such examples, the dense layer can provide an input for the second dense layer.

For the purposes of this disclosure a rectifier (e.g., a ramp function) is an activation function defined as the positive part of its argument:

$$f(x) = x^+ = \max(0, x),$$

where x is the input to a neuron.

At block 110, the processing device and/or another processing device generates a fourth array based on the first and second pattern arrays and the third array. In some embodiments, the generating of the fourth array includes concatenating the first and second pattern arrays and the third array.

At block 112, the processing device and/or another processing device uses one or more additional processes to reduce the fourth array to a numerical value related to an intent of a subject of the security certificate. In some embodiments, the numerical value is a probability of the security certificate being malicious. The probability can be a number between 1 and 0.

In some embodiments, the one or more additional processes includes a dense layer. The dense layer can include a plurality of neurons using a rectifier. Also, the dense layer can include a neuron layer using a sigmoid function. The neuron layer using the sigmoid function can output a probability of the security certificate being malicious. The one or more additional processes can also include a second dense layer that includes a neuron layer using a sigmoid function. Alternatively, the neuron layer using the sigmoid function of the second dense layer can output a probability of the security certificate being malicious. In such examples, the dense layer can provide an input for the second dense layer.

In some embodiments, any one of the first, second, third, and fourth arrays can be vectors. In one embodiment, each array of the first, second, third, and fourth arrays is a vector.

Figure 3:
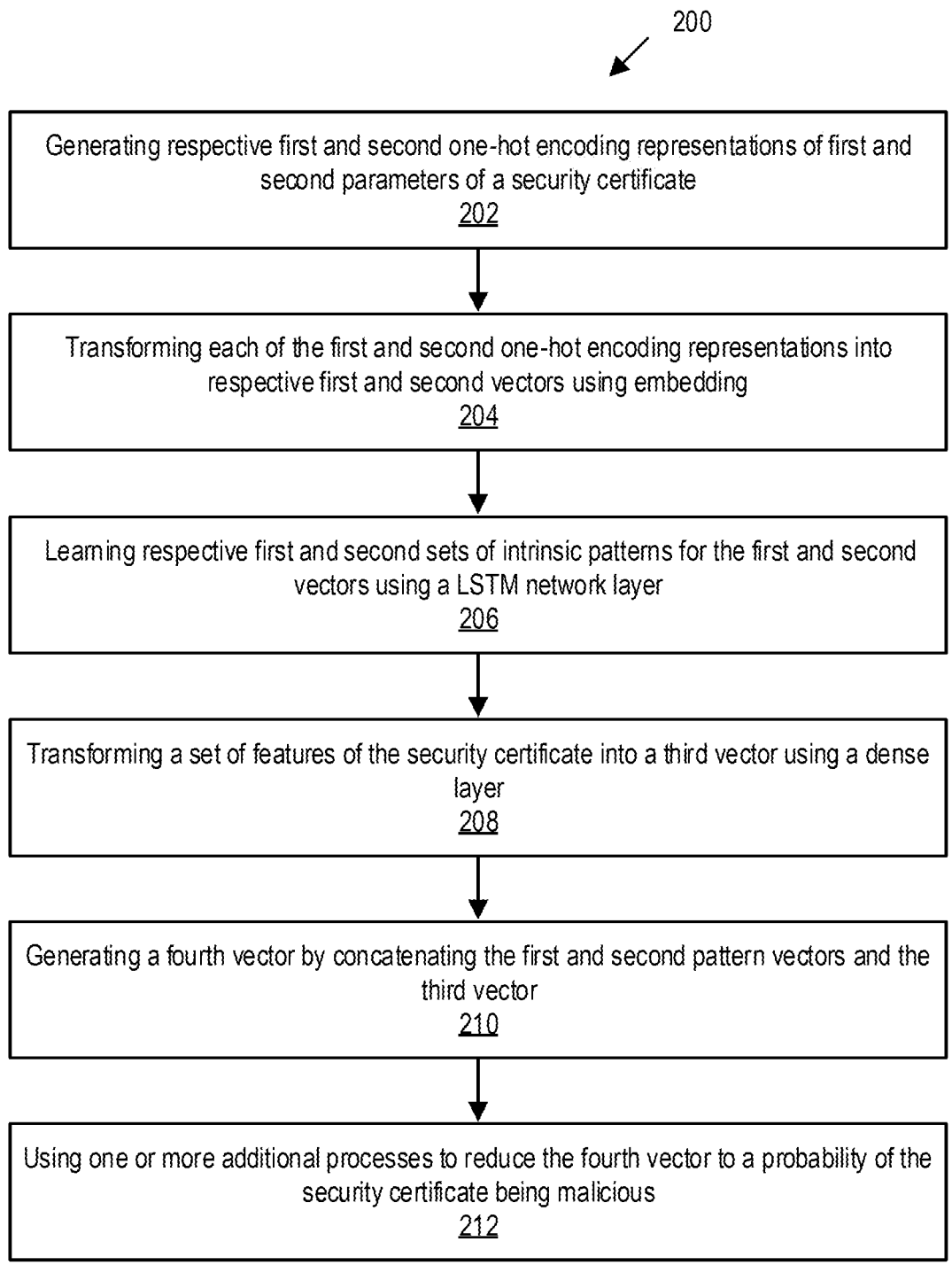
FIG. 3 is a flow diagram of another example method to determine an intent of subjects of security certificates using neural networks, in accordance with some embodiments of the present disclosure.

FIG. 3 is a flow diagram of an example method 200 for determining an intent of a subject of a security certificate (such as a TLS certificate) using neural networks, in accordance with some embodiments of the present disclosure, such as where each array of the first, second, third, and fourth arrays is a vector. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by one or more aspects of the certificate validation system 31. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 202, a processing device generates respective first and second one-hot encoding representations of first and second parameters of a security certificate. At block 204, the processing device and/or another processing device transforms each of the first and second one-hot encoding representations into respective first and second vectors using embedding. At block 206, the processing device and/or another processing device learns respective first and second sets of intrinsic patterns for the first and second vectors using a LSTM network layer. At block 208, the processing device and/or another processing device transforms a set of features of the security certificate into a third vector using a dense layer. At block 210, the processing device and/or another processing device generates a fourth vector by concatenating the first and second pattern vectors and the third vector. At block 212, the processing device and/or another processing device uses one or more additional processes to reduce the fourth vector to a probability of the security certificate being malicious.

In some embodiments, a deep neural network is used as a basis to predict if a TLS certificate or another type of security certificate is used for malicious purposes or at least if the certificate is illegitimate. In such embodiments, the text contained in the subject principal and issuer principal fields of the certificate can be used as inputs for the deep neural network. To achieve this, the text contained in these features can be turned into a matrix representation by using one-hot encoding based on an alphabet, such that X and Y take the form:

X features with shape N×S×V, and
Y label with shape N×V, wherein N is the number of certificates analyzed, S is the maximum number of characters in each of the encoded first and second parameters and V is the number of different characters in the vocabulary, such that for each row in X representing a certificate is predicted a row in Y representing a probability distribution of the next character.

In the above mathematical representation, each row represents a character and is filled with zeros except where the column matches a character in the alphabet. Subsequently, the output of the one-hot encoding is processed with an embedding technique and then the embedded output is used as input for an LSTM network layer. The LSTM network layer creates a vector (referred to herein as a pattern vector or pattern array), which can have a size of 32 features, representing both the subject principal and the issuer principal fields of the certificate.

Additionally, an additional neural network, such as a dense layer neural network (referred to herein as a dense layer) can receive an input of a plurality of features extracted from the certificate. For example, at least 35 features can be extracted from the certificate. E.g., see FIG. 7. The dense layer processes the input and generates a vector representation of that data, such as a vector having a size of 32 features to coincide with the sizes of the output vectors of the LSTM network layer. The output of all three networks (the two LSTM networks and the one dense layer) can be concatenated into a combined vector, such as a combined vector having a size of 96 features. Subsequently, additional neural network layers can be added to process the combined vector until a score or a single value is generated giving a probability as to whether the certificate is malicious and/or illegitimate. Further details are provided below and are illustrated in FIG. 4.

FIG. 4 is a flow diagram of an example method 300 for determining an intent of a subject of a TLS certificate using neural networks, in accordance with some embodiments of the present disclosure, such as where vector outputs are used as well as one-hot encoding, embedding, LSTM networking, dropout functions, and dense layers are used to output a probability of the security certificate being malicious and/or illegitimate. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by one or more aspects of the certificate validation system 31. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Not shown, the method 300 can begin with extracting, by a processing device, at least two parameters of a TLS certificate—e.g., the subject principal parameter 301 and the issuer principal parameter 311. The subject principal parameter 301 includes a subject principal raw string as it is extracted from the certificate, and it can be used as input for neural networks. The issuer principal parameter 311 includes an issuer principal raw string as it is extracted from the certificate, and it can be used as input for neural networks. Using the certificate shown in FIG. 6 as an example, the string "abcdefg.com", the string "Abcdefg Inc.", or a combination thereof of the view of the SSL Server Certificate shown in the figure could be selected as the subject principal raw string. And, for example, the string "hijklmn.com", the string "Hijklmn Inc.", or a combination thereof of the view of the SSL Server Certificate shown in FIG. 6 could be selected as the issuer principal raw string.

Additionally, the method 300 can begin with extracting features of the TLS certificate, which provides extracted features 321. The table illustrated in FIG. 7 shows a list of types of features extracted from the TLS certificate. Any or all of the types of features listed in the table of FIG. 7 can be part of the extracted features 321.

At block 302, the processing device and/or another processing device encodes the subject principal parameter 301. Specifically, one-hot encoding turns the subject principal parameter 301 into an encoded representation of the subject principal parameter 303. The one-hot encoding includes truncating the subject principal raw string of the subject principal parameter to a certain number of characters. For example, one-hot encoding can truncate the subject principal raw string of the subject principal parameter to 150 characters. The one-hot encoding subsequently includes building a matrix with at least one column for each letter or character of a selected alphabet. The English alphabet is one example alphabet that can be selected. The matrix is also built with at least one row for each character in the truncated string. Thus, in the case of a 150-character truncation, up to 150 rows can be built for the matrix. The one-hot encoding then uses the matrix structure and fills each row with 0's except where the string character matches the selected alphabet character. To explain in another way, one-hot encoding can encode categorical variables by mapping each category to a different vector. In a way, one-hot encoding is a simple form of embedding. One-hot encoding takes discrete entities and maps each categorical observation to a vector of 0's, and a single "1" identifies a specific category in the map.

At block 304, the processing device and/or another processing device processes the encoded representation of the subject principal parameter 303 using an embedding transformation. The embedding transformation turns the encoded representation of the subject principal parameter 303 into a vector 305. The size of the vector 305 can correspond with the size of the matrix of the encoded representation of the subject principal parameter 303. For example, where the matrix has up to 150 rows, the vector 305 can have a size 150 rows. The vector 305 can turn the string characters of the matrix into real numbers representative of statistical information associated with the string characters.

Different embedding transformations can be used at block 304, such as entity embeddings or word embeddings. The embedding transformation can include any type of process that transforms and represents discrete variables as vectors. An embedding can be a mapping of a discrete and/or categorical variable to a vector of continuous numbers. Used with neural networks, embedding transformations (also known as "embeddings") can provide low-dimensionality and learned vector representations of discrete variables. Embeddings are useful, especially in the context of use with neural networks, because embedding transformations can reduce the dimensionality of categorical variables.

In some embodiments, the processing device and/or another processing device processes the encoded representation of the subject principal parameter 303 using a neural network embedding, at block 304. A neural network embedding can overcome some limitations of one-hot encoding. As mentioned herein, one-hot encoding may be considered a simpler type of embedding.

At block 306, the processing device and/or another processing device processes vector 305 using an LSTM network layer. The LSTM network layer uses neurons (such as 32 neurons) using the vector 305 as input. In other words, the embedded string of vector 305 is used as input for the LSTM network layer. The LSTM network layer learns string patterns in the vector 305, and outputs a pattern vector 307. At block 306, each neuron of the LSTM network layer processes the input vector 305 and the next neuron receives the output from the last neuron and the vector 305 itself.

At block 308, the processing device and/or another processing device processes pattern vector 307 using a dropout process. The dropout process removes neurons from the LSTM network layer and with the dropout process each neuron of the LSTM network layer can have a 10% probability of being removed. The dropout process boosts the LSTM network layer's performance by removing neurons that are not improving learning. The dropout process of block 308 outputs an enhanced pattern vector 309.

Similar operations are also performed on the issuer principal parameter 311, such that blocks 312, 314, 316, and 318 perform similar operations as blocks 302, 304, 306, and 308 but the initial input is the issuer principal parameter 311 for blocks 312, 314, 316, and 318 instead of the subject principal parameter 301. For example, at block 312, the processing device and/or another processing device encodes the issuer principal parameter 311. Specifically, one-hot encoding turns the issuer principal parameter 311 into an encoded representation of the issuer principal parameter 313. And, similarly, for example, the one-hot encoding of the issuer principal parameter 311 includes truncating the issuer principal raw string of the issuer principal parameter to a certain number of characters and subsequently includes building a matrix.

Also, for example, at block 314, the processing device and/or another processing device processes the encoded representation of the issuer principal parameter 313 using a similar embedding transformation. The embedding transformation turns the encoded representation of the issuer principal parameter 313 into a vector 315 (which is analogous to vector 305).

Also, for example, at block 316, the processing device and/or another processing device processes vector 315 using a similar type of LSTM network layer. The LSTM network layer of block 316 uses neurons (such as 32 neurons) using the vector 315 as input, which is analogous to block 306. Also, similarly, the LSTM network layer of block 316 learns string patterns in the vector 315, and outputs a pattern vector 317 (which is analogous to pattern vector 307).

At block 318, the processing device and/or another processing device processes pattern vector 317 using a similar dropout process to the process used at block 308. The dropout process of block 318 outputs an enhanced pattern vector 319 (which is analogous to enhanced pattern vector 309).

As mentioned, the method 300 can also begin with extracting features of the TLS certificate, which provides extracted features 321. The extracted features 321 can be extracted by feature engineering process from the certificate and can be in the form of an array of data such as a vector.

A list of example types of extracted features and further details regarding the types extracted features are provided in the Table of FIG. 7.

The table of FIG. 7 is derived from results of some of the processes and techniques described herein. The techniques were used to extract indicators that can differentiate a malicious certificate from a legitimate certificate. The extraction of indicators focused on what information is contained or implicit in a certificate to make it trustworthy, keeping in mind that certificates with less information are more suspicious. It is assumed in the generation of the table that attackers will not do rigorous validations to create a certificate, so they rely on self-signed and free generated certificates usually. Based on such an assumption, the table was created. Features such as whether a certificate is self signed, domain validated, organization validated or extended validated are some of the extracted features. Also, free or inexpensive generated certificates usually have a 30- to 90-day validity range, whereas self-signed certificates can be out of that range since they have as much days of validity as selected by the creator. Thus, the validity range of days of a certificate can also give a clue about how likely it was created by an attacker.

With all these aforesaid features of the certificate, certain features can be prioritized for using as input. For example, in some embodiments identifying if the certificate was self-signed and generated for free or paid can be used as input.

To create the table of FIG. 7, a Boolean Matrix was used for plugging in the information the certificate contains and determining if an element of the information was indicative of an intent of a subject of the certificate. Also, for building the table, a common name (CN) was extracted if the certificate had one as well the validity day range was determined and the number of characters of the subject principal and issuer principal was calculated. Further, the table was derived from calculating the Euclidean distance of domains against an English character distribution as a way to detect random names.

At block 322, the processing device and/or another processing device processes the extracted features 321 using a dense layer. The dense layer can include 32 neurons using a rectified linear unit activation function. The dense layer outputs a dense layer processed vector 323 associated with the extracted features 321.

At block 324, the processing device and/or another processing device processes the dense layer processed vector 323 using a dropout process—such as a dropout process that is analogous to the drop out process at block 308 or 318. The dropout process removes neurons from the dense layer and with the dropout process each neuron of the LSTM network layer can have a 10% probability of being removed. The dropout process boosts the dense layer's performance by removing neurons that are not improving learning. The dropout process of block 324 outputs an enhanced dense layer processed vector 325.

At block 326, the processing device and/or another processing device concatenates the final outputs from blocks 308, 318, and 324 into a single vector (the concatenated vector 327), which will be used as input to a next neural network layer. In other words, the processing device and/or another processing device concatenates the enhanced pattern vector 309, the enhanced pattern vector 319, and the enhanced dense layer processed vector 325 into the concatenated vector 327.

At block 328, the processing device and/or another processing device processes the concatenated vector 327 using a second dense layer. The second dense layer can include 10 neurons using a rectified linear unit activation function. The dense layer outputs dense layer processed vector 329 associated with the concatenated vector 327 and hence also associated with the enhanced pattern vector 309, the enhanced pattern vector 319, and the enhanced dense layer processed vector 325.

At block 330, the processing device and/or another processing device processes the dense layer processed vector 329 using a dropout process—such as a dropout process that is analogous to the drop out process at block 308, 318 or 324. The dropout process removes neurons from the dense layer and with the dropout process each neuron of the LSTM network layer can have a 10% probability of being removed. The dropout process boosts the dense layer's performance by removing neurons that are not improving learning. The dropout process of block 330 outputs an enhanced dense layer processed vector 331.

At block 332, the processing device and/or another processing device processes the enhanced dense layer processed vector 331 using a third dense layer. The third dense layer can use one neuron layer using a sigmoid function to calculate a number between 0 and 1, which is prediction score 333. The number between 0 and 1 of prediction score 333 can represent the probability of the certificate being used for malicious activities. The number between 0 and 1 of prediction score 333 can represent the probability that the certificate is malicious or the probability that the certificate is illegitimate depending on the embodiment. Indirectly, through the multiple layers of neural networks, the prediction score 333 is associated with the concatenated vector 327 and hence also associated with the enhanced pattern vector 309, the enhanced pattern vector 319, and the enhanced dense layer processed vector 325.

Figure 8:
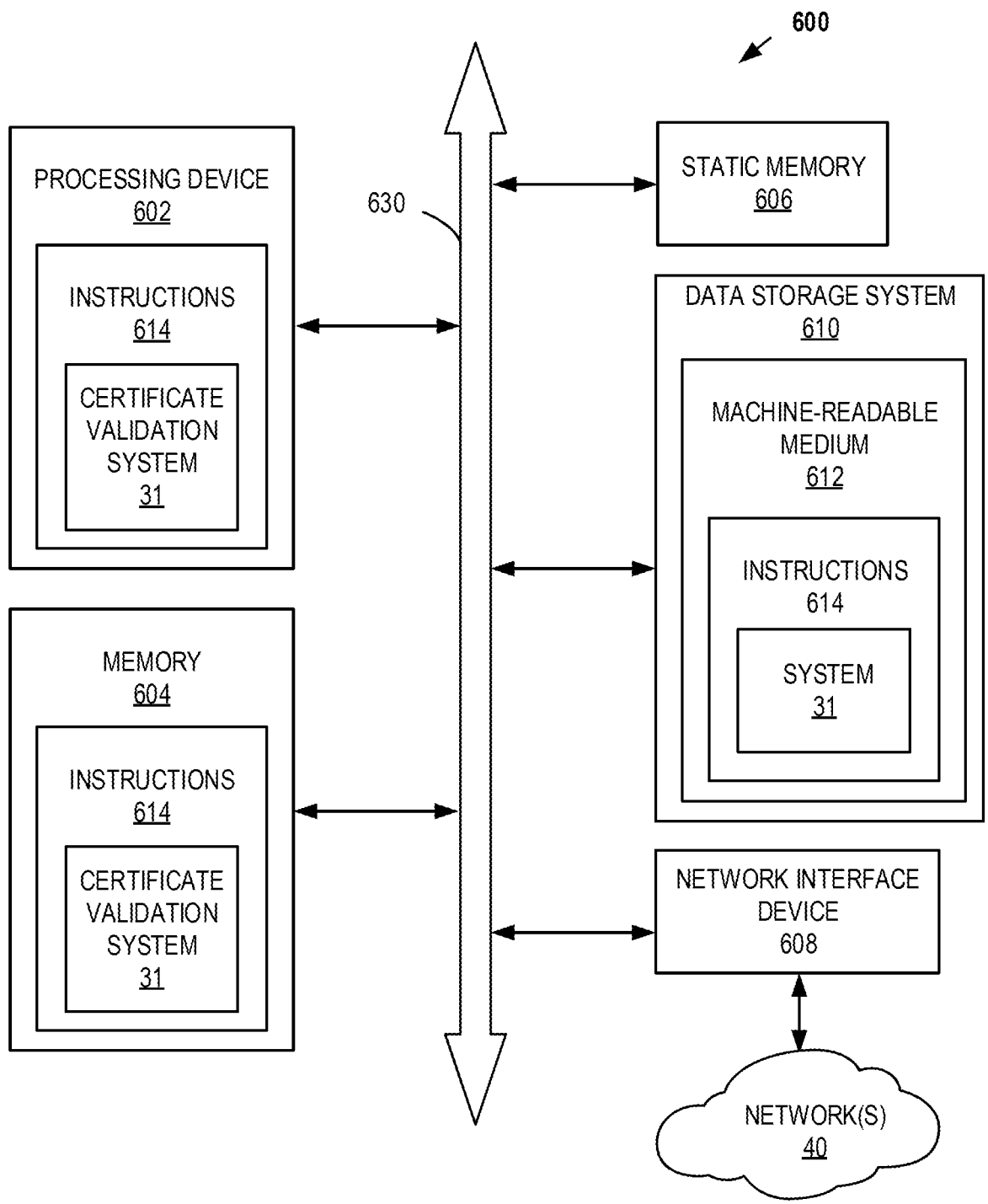
FIG. 8 is a block diagram of example aspects of an example computer system, in accordance with some embodiments of the present disclosure.

FIG. 8 is a block diagram of example aspects of an example computer system 600, in accordance with some embodiments of the present disclosure. FIG. 8 illustrates parts of the computer system 600 within which a set of instructions, for causing the machine to perform any one or more of the methodologies discussed herein, can be executed. In some embodiments, the computer system 600 can correspond to a host system that includes, is coupled to, or utilizes memory or can be used to perform the operations of a controller (e.g., to execute an operating system to perform operations corresponding to the certificate validation system 31). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random-access memory (DRAM) such as synchronous DRAM (SDRAM) or Rambus DRAM (RDRAM), etc.), a static memory 606 (e.g., flash memory, static random-access memory (SRAM), etc.), and a data storage system 610, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 614 for performing the operations and steps discussed herein, such as operations associated with the certificate validation system 31. The computer system 600 can further include a network interface device 608 to communicate over the communications network(s) 40 of FIG. 1.

The data storage system 610 can include a machine-readable storage medium 612 (also known as a computer-readable medium) on which is stored one or more sets of instructions 614 or software embodying any one or more of the methodologies or functions described herein, such as operations associated with the certificate validation system 31. The instructions 614 can also reside, completely or at least partially, within the main memory 604 and/or within the processing device 602 during execution thereof by the computer system 600, the main memory 604 and the processing device 602 also constituting machine-readable storage media.

In one embodiment, the instructions 614 include instructions to implement functionality corresponding to the certificate validation system 31. While the machine-readable storage medium 612 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
receiving, in an artificial neural network (ANN), a plurality of groups of encoded parameters generated from a transport layer security (TLS) certificate, wherein the plurality of groups of encoded parameters comprises a first group of encoded parameters and a second group of encoded parameters, wherein the ANN comprises a first portion and a second portion separate from the first portion in processing inputs;

processing, by the first portion of the ANN, the first group of encoded para meters to generate first outputs for the TLS certificate, wherein the first group of encoded parameters are generated from a subject principal string of the TLS certificate;

processing, by the second portion of the ANN independent of the processing of the first portion, the second group of encoded parameters to generate second outputs for the TLS certificate, wherein the second group of encoded para meters are generated from an issuer principal string of the TLS certificate;

combining, in the ANN, the first outputs and the second outputs to generate a score; and outputting, by the ANN, the score of the TLS certificate based on the plurality of groups of encoded parameters.

2. The method of claim 1, wherein the ANN comprises a recurrent neural network (RNN) configured to process a first group of the plurality of groups of encoded parameters.

3. The method of claim 2, wherein the RNN comprises a long short-term memory (LSTM) network.

4. The method of claim 1, wherein the TLS certificate is a classified TLS certificate that has an issuer of the certificate and a subject of the certificate, the subject having a classification of being associated with a malicious activity, and wherein the method further comprises:

training the ANN to match the score with the classification of the subject classified TLS certificate.

5. The method of claim 1, wherein the score is representative of the probability that the TLS certificate has a subject associated with a malicious activity selected from a group consisting of phishing and malware attack.

6. The method of claim 1, further comprising:
comparing the score to a threshold value; and
determining that the TLS certificate is more likely than not associated with a malicious activity, based on the comparison of the score to the threshold value.

7. The method of claim 1, further comprising:
processing the score to output a probability value related to the probability that the TLS certificate is associated with a malicious activity.

8. The method of claim 1, wherein the subject principal string has a plurality of alphanumerical field values of the TLS certificate identifying attributes of the subject of the TLS certificate, and wherein the issuer principal string has a plurality of alphanumerical field values of the TLS certificate identifying attributes of the issuer of the TLS certificate.

9. The method of claim 8, wherein the subject principal string comprises one or more fields selected from the group of fields consisting of an organization field, a company field, a state field, a location field, and a common name (CN) field, and wherein the issuer principal string comprises one or more fields selected from the group of fields consisting of an organization field, a company field, a state field, a location field, and a CN field.

10. The method of claim 1, wherein the first portion of the ANN comprises a first long short-term memory (LSTM) network layer to process the first group of encoded parameters, and the second portion of the ANN comprises a second LSTM network layer to process the second group of encoded parameters.

11. The method of claim 10, wherein the ANN comprises a third portion separate from the first portion and the second portion, the third portion includes a dense layer having at least one rectifier, and wherein the method further comprises:

receiving, in the dense layer, an encoded set of features of the TLS certificate, separate from the first group of encoded parameters and the second group of encoded parameters; and outputting, by the dense layer, a dense layer output vector according to the encoded set of features.

12. The method of claim 11, further comprising concatenating, in the ANN, the dense layer output vector, the first outputs of the first portion, the second outputs of the second portion to generate a concatenated vector.

13. The method of claim 12, further comprising:
receiving, by a second dense layer of the ANN, the concatenated vector;
outputting, by the second dense layer, a second dense layer output vector according to the concatenated vector, wherein the second dense layer comprises a rectifier.

14. The method of claim 13, further comprising:
receiving, by a dropout layer of the ANN, the second dense layer output vector;
generating, by the dropout layer, a reduced vector;
receiving, by a third dense layer of the ANN, the reduced vector, the third dense layer comprises a sigmoid function;
outputting, by the third dense layer, the score according to the reduced vector.

15. A non-transitory computer-readable storage medium comprising instructions that, when executed by a processing device, cause the processing device to:

input a plurality of groups of encoded parameters of a transport layer security (TLS) certificate into an artificial neural network (ANN), wherein the plurality of groups of encoded parameters comprises a first group of encoded para meters and a second group of encoded parameters, wherein the ANN comprises a first portion and a second portion separate from the first portion in processing inputs;

processing, by the first portion of the ANN, the first group of encoded parameters to generate first outputs for the TLS certificate, wherein the first group of encoded parameters are generated from a subject principal string of the TLS certificate;

processing, by the second portion of the ANN independent of the processing of the first portion, the second group of encoded parameters to generate second outputs for the TLS certificate, wherein the second group of encoded parameters are generated from an issuer principal string of the TLS certificate;

combining, in the ANN, the first outputs and the second outputs to generate a score; and output the score according to an algorithm representative of the ANN and the plurality of encoded parameters.

16. The non-transitory computer-readable storage medium of claim 15, wherein the ANN comprises a long short-term memory (LSTM) network.

17. The non-transitory computer-readable storage medium of claim 15, wherein the TLS certificate is a classified TLS certificate that has an issuer of the certificate and a subject of the certificate, the subject having a classification of being associated with a malicious activity, and wherein the method further comprises:

training the ANN to match the score with the classification of the subject classified TLS certificate.

18. A computer system, comprising:
a processing device; and memory in communication with the processing device and storing instructions that, when executed by the processing device, cause the processing device to:

input a plurality of groups of encoded para meters of a transport layer security (TLS) certificate into an artificial neural network (ANN), wherein the plurality of groups of encoded parameters comprises a first group of encoded para meters and a second group of encoded parameters, wherein the ANN comprises a first portion and a second portion separate from the first portion in processing inputs;

processing, by the first portion of the ANN, the first group of encoded para meters to generate first outputs for the TLS certificate, wherein the first group of encoded parameters are generated from a subject principal string of the TLS certificate;

processing, by the second portion of the ANN independent of the processing of the first portion, the second group of encoded para meters to generate second outputs for the TLS certificate, wherein the second group of encoded parameters are generated from an issuer principal string of the TLS certificate;

combining, in the ANN, the first outputs and the second outputs to generate a score; and output the score according to an algorithm representative of the ANN and the plurality of encoded parameters.

* * * * *